United States Patent [19]
Cotler

[11] Patent Number: 6,161,651
[45] Date of Patent: Dec. 19, 2000

[54] LUBRICATION SYSTEM WITH MODULATED DROPLET EMISSION

[75] Inventor: Elliot M. Cotler, Brooklyn, N.Y.

[73] Assignee: Uniwave, Inc.

[21] Appl. No.: 09/316,637

[22] Filed: May 21, 1999

[51] Int. Cl.$^7$ ...................................................... F16N 7/30
[52] U.S. Cl. .......................... 184/55.1; 137/888; 118/301; 118/678
[58] Field of Search .................................. 184/55.1, 55.2, 184/6.15; 239/99; 137/888; 118/678, 301

[56] References Cited

U.S. PATENT DOCUMENTS

| | | | |
|---|---|---|---|
| 2,341,827 | 2/1944 | Sukumlyn | 118/301 |
| 2,432,659 | 12/1947 | Criswell | 118/301 |
| 2,672,842 | 3/1954 | Winters et al. | 118/678 |
| 3,756,348 | 9/1973 | Iizumi | 184/55.2 |
| 3,841,438 | 10/1974 | Tine et al. | 184/55.2 |
| 4,332,309 | 6/1982 | Bereit | 184/55.2 |
| 4,790,155 | 12/1988 | Daniel et al. | 118/678 |
| 4,800,102 | 1/1989 | Takada | 118/301 |
| 5,316,582 | 5/1994 | Dubel | 118/301 |
| 5,350,600 | 9/1994 | Kubota | 118/301 |
| 5,639,028 | 6/1997 | Kotlyar | 239/474 |
| 5,961,299 | 10/1999 | Gruett et al. | 184/55.2 |
| 6,086,954 | 7/2000 | Kaufmann et al. | 118/678 |

*Primary Examiner*—David A. Bucci
*Assistant Examiner*—Chong H. Kim
*Attorney, Agent, or Firm*—Schweitzer Cornman Gross & Bondell LLP

[57] ABSTRACT

A lubrication system for the intermittent lubrication of a lubrication target, comprises a lubrication emitter having structure for generating a series of lubrication liquid droplets and carrying the droplets along a travel path by a propellent gas stream issuing from the emitter, a lubrication target located in a spaced relationship from the emitter within the travel path and a moving barrier located proximate the emitter between the emitter and target and in a non-contact relationship with the emitter. The barrier generates an intermittent disturbance to the propellent gas stream whereby the carrying of the droplets by the propellent gas stream is prevented during the time interval of the disturbance. Carrying of the droplets by the propellent gas stream occurs during the time interval in which the disturbance ceases. The barrier can take the form of a disc or a shell surrounding the target. The solid surface of the disc or shell generates the disturbance, while one or more apertures in the solid surface interrupt the generation of the disturbance.

14 Claims, 4 Drawing Sheets

LUBRICATION SYSTEM WITH MODULATED DROPLET EMISSION

The present invention is directed to a lubrication system having particular utility in connection with the lubrication of devices, such as textile machine equipment, requiring the dispensation of a lubricant in coordination with the motion of the device to be lubricated.

BACKGROUND OF THE INVENTION

It is well recognized that the lubrication of moving parts may be required to allow continuous operation thereof. In the textile arts, for example, knitting, sewing and embroidery machines and the like require continuous lubrication of the sewing and knitting needles and associated moving parts to prevent premature wear, as well as catastrophic failure. Often, such lubrication is provided by systems providing a well-directed mist or series of droplets, either on a continuous or intermittent basis. Such known devices are effective when the mechanisms to be lubricated are continuously exposed.

Intermittent lubrication systems are also known to provide lubrication on an intermittent basis, either because constant lubrication is not required or because access to the device to be lubricated by the lubricating means is not continuous. Such systems typically rely upon timers, mechanical linkages, and/or mechanical or electrical sensors to determine the position of either the device to be lubricated or some other device or object affecting the dispensation of the lubricant and control the release of lubricant. Great care must be taken to insure that the lubricant is delivered in proper synchronism with the operation of the device to be lubricated.

In certain textile machines, for example, elements to be lubricated are behind or associated with a shield or baffle. The baffle has a construction which allows passage of a lubricant past the baffle only on an intermittent basis, and typically when an aperture in the baffle is in register with the lubricator. The dispensation of the lubricant intended for the mechanism behind the baffle must be metered and timed to correspond with the alignment of the aperture. Heretofore such a task has been difficult to achieve, requiring precise timing systems which take into account both the physical positioning of the involved elements, as well as the transit time for the lubricant. Typically, the lubrication of such mechanisms has been sporadic, resulting in lubricant-starved systems and the dispersal of lubricant where it is not needed or required.

It is accordingly a purpose of the present invention to provide a new and improved lubrication system for modulating the output of lubricant.

Another purpose of the present invention to provide a new and improved lubrication system which allows the lubricant to be directed with precision to a target which is intermittently exposed to a lubrication source.

Yet a further purpose of the present invention is to provide a lubrication system for precisely delivering lubricant in a modulated manner which does not require mechanical or electrical linkages between the lubricator and the lubrication target.

BRIEF DESCRIPTION OF THE INVENTION

In accordance with the foregoing and other objects and purposes, the lubricating system of the present invention comprises a lubricant emitting apparatus which utilizes a gas propellant stream to form and carry a series of lubricant droplets along an airborne travel path from the emitter to a distal target to be lubricated by the droplets. A modulator in the form of a moving baffle is located proximate the lubricant emitter of the emitting apparatus and between the emitting apparatus and target to control the delivery of the droplets to the target. The baffle is formed with one or more apertures through which the lubricant droplets can pass, and which are sequentially aligned with the droplet travel path by the motion of the baffle to permit travel of the droplets to the target when so aligned.

The nozzle is positioned in close proximity to the baffle such that, when an aperture is not aligned with the travel path, deflection of the flow of the propellent stream by the close proximity of the baffle surface occurs, generating a stagnation pressure whereby the development of lubricant droplets and their discharge from the emitter is prevented. The emitting apparatus is thus effectively modulated into an "off" condition. As a modulator aperture passes in front of the emission apparatus and in the travel path, the stagnation pressure drops to zero, effectively modulating the emitting apparatus into the "on" condition, permitting the propellant gas to generate lubricant drops which are propelled by the propellant gas through the aligned aperture to the target. The on-off modulation continues with the continuous motion of the baffle. The result is a precisely metered lubricant flow which is timed with the orientation of the openings in front of the nozzle, without physical contact between the modulator and emission apparatus and without the need for additional sensing or control components of any kind.

BRIEF DESCRIPTION OF THE DRAWING

A fuller understanding of the present invention will be obtained upon review of the following detailed description of a preferred but nonetheless illustrative embodiment thereof, when reviewed in connection with the annexed drawings, wherein.

DETAILED DESCRIPTION OF THE INVENTION

Figure 1:
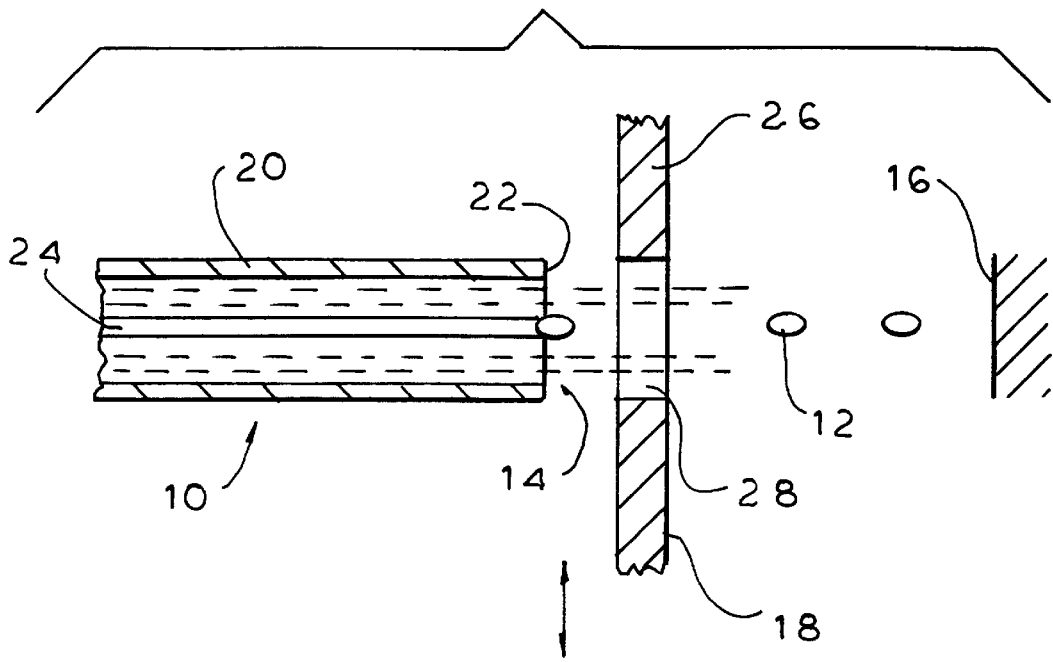
FIG. 1 is a diagrammatic representation of the present invention, wherein a baffle opening is oriented the travel path for lubricant droplets generated by a lubricant emitting apparatus.
Figure 2:
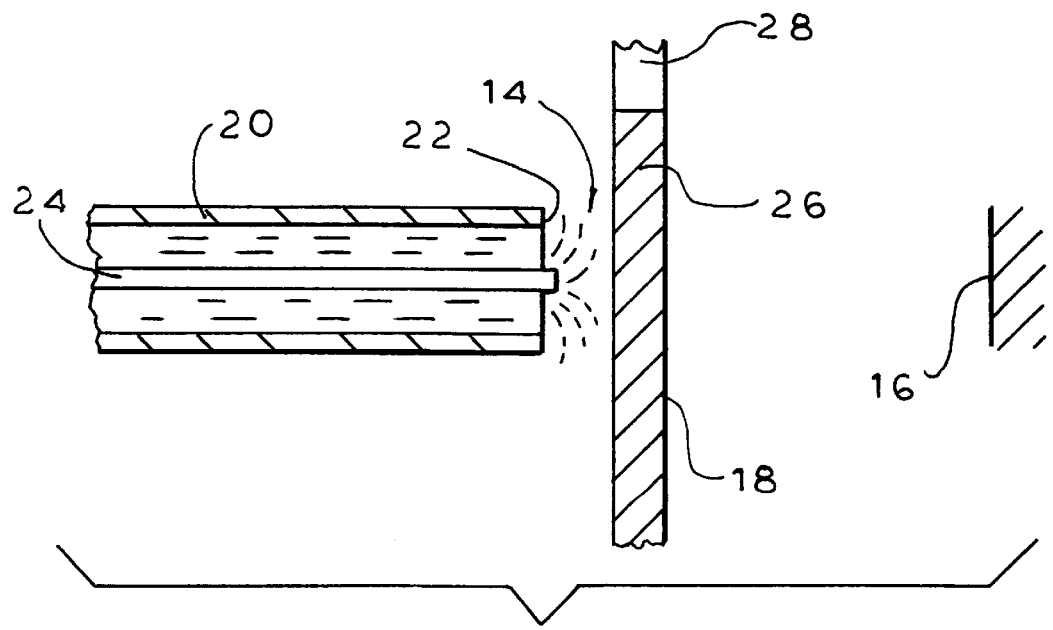
FIG. 2 is a diagrammatic representation wherein the baffle wall is obstructing the travel path for the droplets.

As shown in FIGS. 1 and 2, the present invention includes a lubricant-emitting apparatus 10 for generating a series of lubricant droplets 12 which are driven by a propellent or carrier gas flow 14 from an end of the apparatus along a travel path to an intended lubrication target 16 in the path. In general terms the lubricant emitting apparatus may comprise a generally cylindrical housing 20 terminating at end 22 from which the droplets are emitted. A core 24 is located within the housing 20 and provides a surface upon which the lubricant collects and travels under the drive influence of the propellent gas flowing within the housing towards the end of the apparatus where it forms the droplets which are driven to the target by momentum imparted to them by the stream of the carrier gas. Under normal circumstances, with the flow of the propellent or carrier gas being unimpeded, the lubricant droplets form and are propelled in a continuous manner.

Baffle modulator 18 is positioned proximate the end of the emitting apparatus. The baffle consists of a solid surface 26 having one or more apertures 28 therein. Drive means (not shown) are coupled to the baffle to cause portions of the solid surface 26 and the apertures 28 to alternatively be positioned within the carrier gas flow 14 within the travel path of the lubricant droplets emitted by the emitter apparatus.

When a baffle aperture is in alignment with the carrier gas flow, as shown in FIG. 1, the gas flow is not disturbed, and the aperture provides access for the emitted droplets to pass through the baffle along the travel path and reach the target 16. When a solid portion of the baffle passes in front of the emitter, however, as depicted in FIG. 2, the exiting stream of propellant gas hits the baffle and develops a stagnation or back pressure region about end 22. The development of this pressure gradient prevents the propellant gas from forming the lubricant droplets and dislodging the drops so formed from the end of the core. Thus, the lubricant continues to collect along the core and the emission of lubricant is halted. When a baffle aperture again aligns with the end of the emitter and the travel path, the stagnation pressure dissipates, allowing the carrier gas stream to again exit the emitter in a substantially unrestricted manner, and allowing the lubricant droplets to form and be carried by the exiting carrier gas along the travel path to the target as required.

Figure 4:
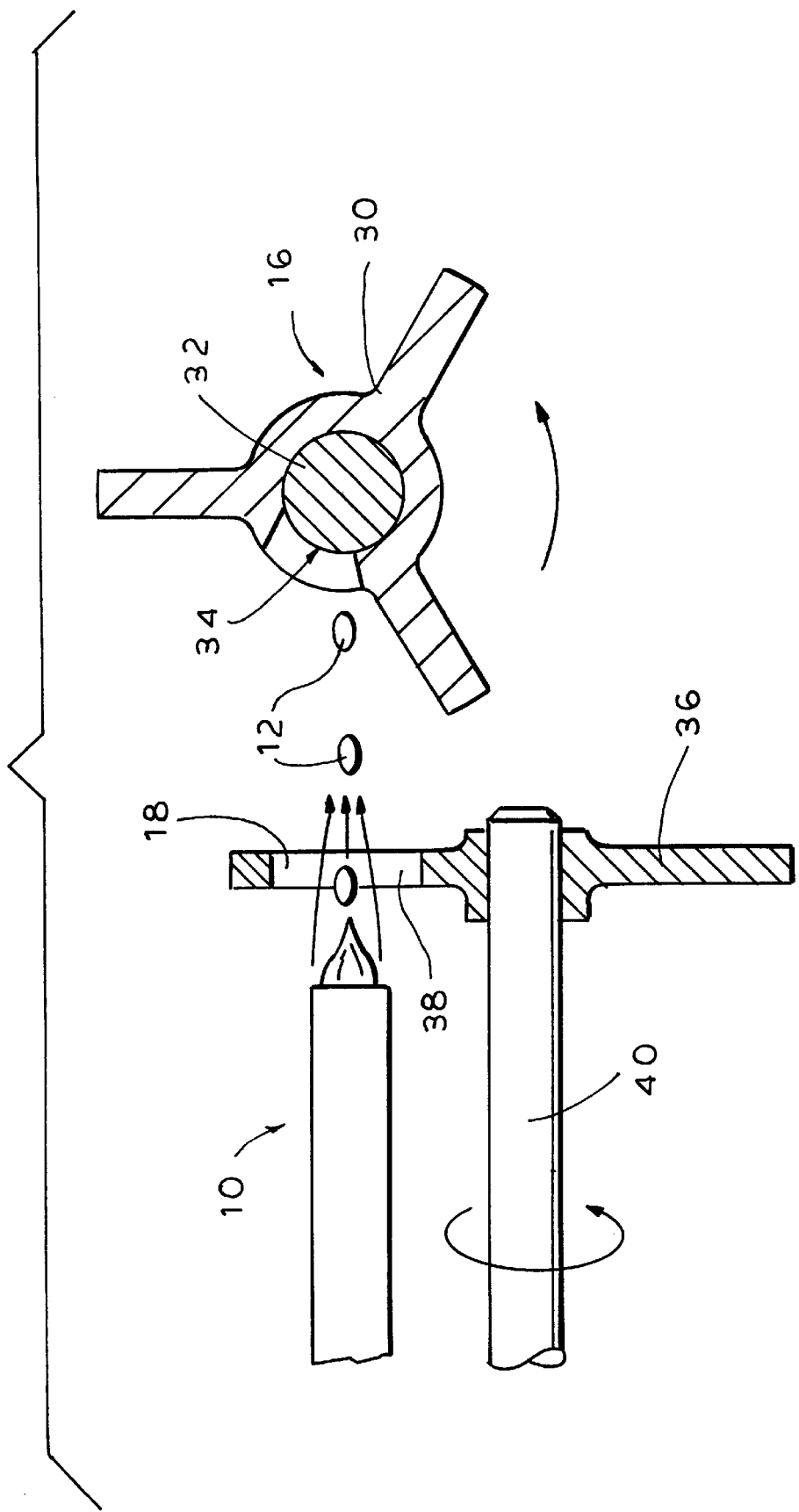
FIG. 4 is a diagrammatic representation of a first embodiment of a lubrication system of the present invention.

FIG. 4 illustrates an exemplary form of a lubricator of the invention. Such a construction is illustrative of mechanisms in the textile arts which require a timed and focused stream of lubricant to be applied to a particular target mechanism. As depicted in FIG. 4, target 16 may be in the form of a rotating part 30 mounted upon fixed shaft 32. A lubrication port or area 34 is provided to allow lubricant to reach the contact surfaces between the shaft and the rotating part. It is desired that the lubricant be applied only to the port area 34 but not to other portions of the rotating part. Thus a lubricant stream must be modulated.

Located forwardly of the shaft and part is the modulator 18, which may be either specially installed as part of the invention, or may be in the form of a pre-existing component which blocks direct access to the rotating part 30. In either event the modulator may be in the form of a baffle disc having a solid portion 36 and an aperture 38. The disc is centrally mounted upon shaft 40. The plane of the disc is preferably perpendicular to the travel path for the lubricant droplets, the axis of shaft 40 being parallel to the travel path.

Lubrication emission apparatus 10 is positioned such that the path of travel for its emitted lubricant droplets 12 is directed towards the port 34. The baffle disc is located proximate the emission apparatus such that the solid portion 36, when aligned with the travel path, creates the propellent flow back-pressure to prevent the generation and emission of the lubricant droplets. The speed of rotation of the baffle, and the size and position of the aperture 38 therein, are chosen to synchronize with the rotation of the part 30 such that when the aperture is aligned with the nozzle the lubricant droplets allowed to be generated are carried along the travel path to contact the target area.

Figure 5:
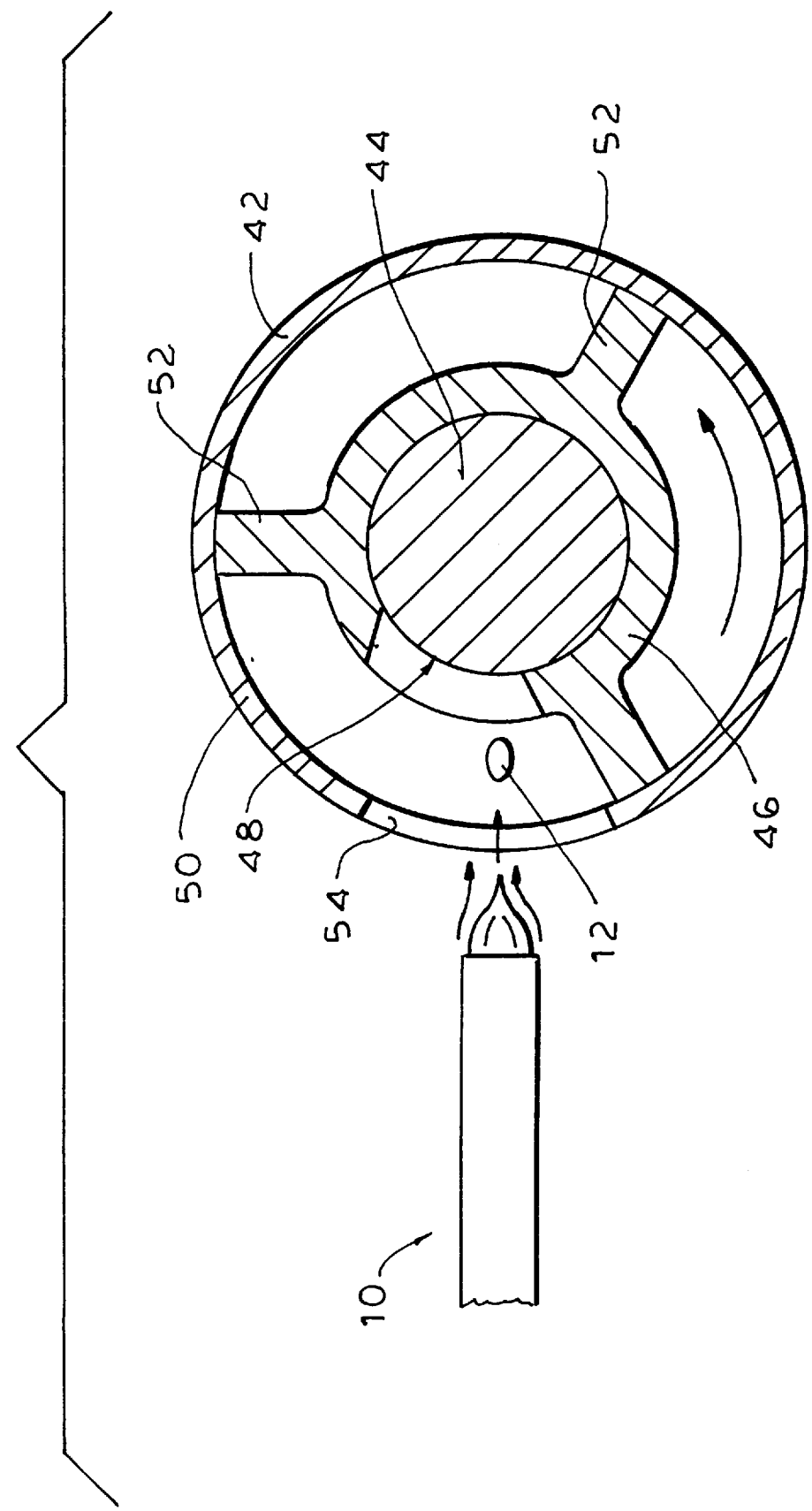
FIG. 5 is a diagrammatic representation of a second embodiment of the invention.

In a similar manner, the lubricator apparatus of FIG. 5 comprises a circular rotor assembly 42 journaled for rotation upon supporting shaft 44. The inner collar 46 of the rotor in which the supporting shaft 44 is journaled is provided with a lubrication port or target area 48 for bearing surface lubrication. An outer cylindrical baffle shell or cover 50 is supported by arms 52. While the baffle shell or cover 50 is shown as being cylindrical, other shell shapes may be employed. Serving as a modulator, the baffle 50 is provided with an aperture 54 generally aligned with the lubrication port 48. Lubrication emission apparatus 10 is positioned in close proximity to the baffle and is aimed towards the lubrication port such that modulation of the droplets generated and launched by the emission apparatus is modulated by the back-pressure effects generated by the baffle as it rotates. Because the baffle and lubrication port are parts of an integral assembly, rotational synchronism between them is assured. The aperture 54 need only be circumferentially positioned with respect to the port to accommodate the travel time for the droplets to accommodate the rotational speed of the rotor.

Figure 3:
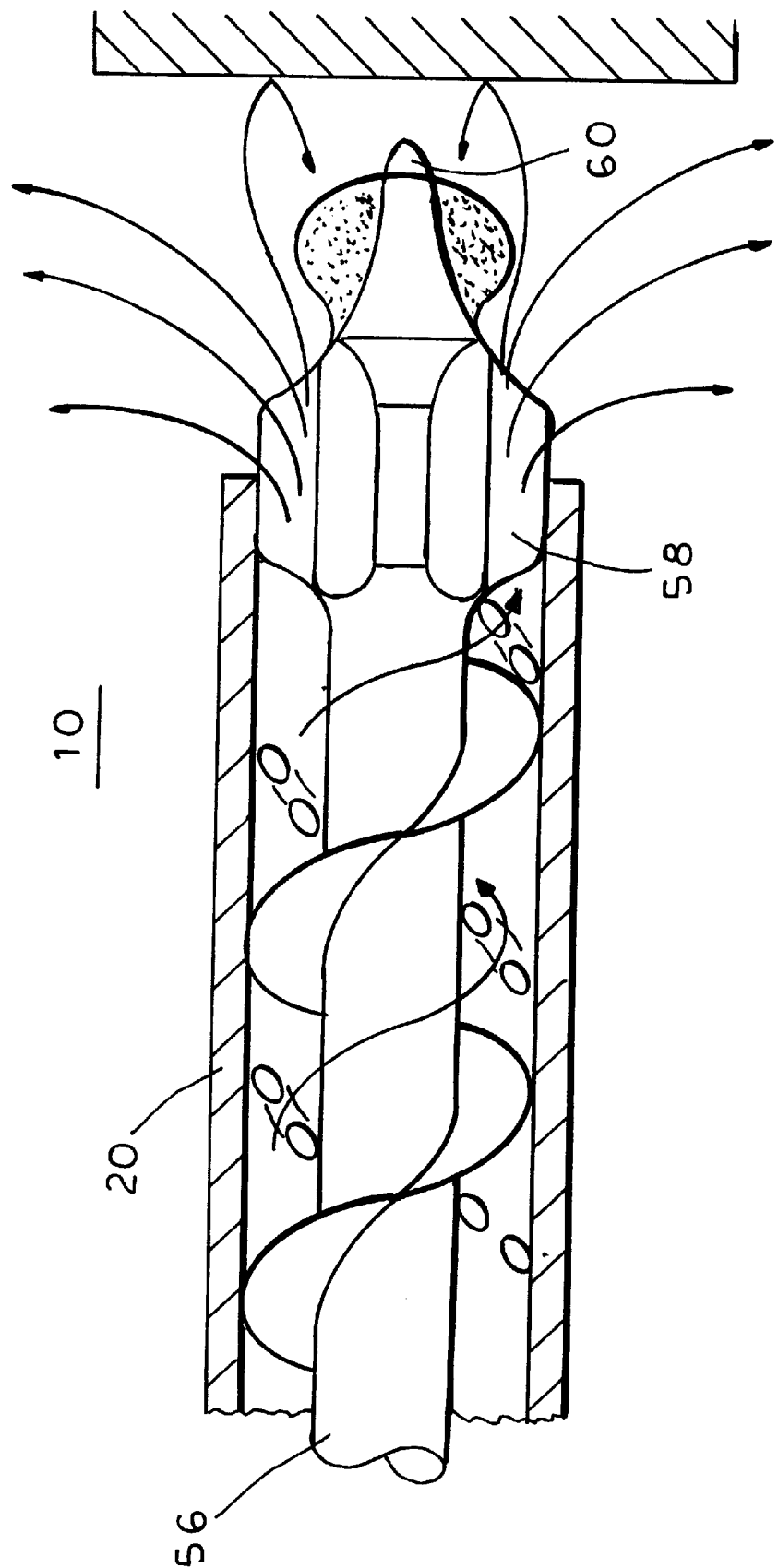
FIG. 3 is a sectional view of a lubricant emitting apparatus of a preferred form for carrying out the invention.

A preferred, but nonetheless illustrative construction for the lubrication emitter assembly 10 in the form of a nozzle which may be used in connection with the present invention is depicted in FIG. 3. This structure is set forth in greater detail in U.S. Pat. No. 5,639,028, the disclosure of which is hereby incorporated by reference. The nozzle is provided with an oil mist carried in a compressed air flow introduced to the nozzle through appropriate tubing. As shown, the cylindrical housing 20 of the construction supports helical core or stem 56, the flute thereof engaging the inner surface of the housing. The core terminates at the distal end of the housing in a series of collecting flutes 58, the core tapering forwarding thereof to a needle-like emitting tip 60. As the pressurized air-oil mist admitted into the housing travels through the housing, the coil collects upon the inner surface of the housing and continues to migrate, under the influence of the pressurized air, towards the distal end of the housing and the helical stem therein. The flutes of the stem collect the oil, which is driven by the pressurized gas onto the emitting tip 60. The continuing flow of pressurized air causes the collected oil to form into droplets which are subsequently dislodged by the pressurized air flow and are carried by the air flow to a target.

When a baffle surface is in close proximity to the end of the emitter, however, the exiting flow is deflected radially, and the axial drag transferred to the collecting oil is insufficient to allow the development of drops and the carriage thereby. When the baffle surface is removed, such as by the existence of an aperture therethrough passing proximate the emitter, a generally laminar axial flow for the exiting gas flow is re-instituted, and sufficient energy is transported to the oil to propel accumulated droplets in an axial direction to the target area.

The present invention provides a method and apparatus for modulating a lubricant flow in a non-contact manner. One skilled in the art can appreciate that modification, adaptations and variations to the invention as disclosed herein may be developed without departing from the intended scope of the invention.

I claim:

1. A lubrication system for the intermittent lubrication of a lubrication target, comprising a lubrication emitter having means for generating a series of lubrication liquid droplets and carrying the droplets along a travel path by a propellent gas stream issuing from the emitter;

a lubrication target located in a spaced relationship from said emitter within the travel path; and moving barrier means located proximate said emitter between said emitter and said target and in a non-contact relationship with said emitter for intermittently generating a disturbance to said propellent gas stream whereby the carrying of the droplets by the propellent gas stream is prevented during the time interval of such disturbance, the carrying of the droplets by the propellent gas stream occurring during the time interval in which the disturbance ceases.

2. The system of claim 1 wherein said moving barrier comprises a plate with at least one aperture therein along a path intersecting the travel path, a time interval in which the disturbances ceases being a period of time that an aperture intersects said travel path.

3. The system of claim 2 wherein said plate is a disc oriented in a plane perpendicular to the travel path.

4. The system of claim 3 further comprising means for rotating said disc about a central axis parallel to said travel path.

5. The system of claim 2 wherein said plate is a shell surrounding the lubrication target.

6. The system of claim 5 further comprising means for rotating said shell about the lubrication target.

7. The system of claim 5 wherein said shell is in the form of a cylinder.

8. A lubrication system for the intermittent lubrication of a lubrication target, comprising a lubrication emitter having means for generating a series of lubrication liquid droplets and carrying the droplets along a travel path by a propellent gas stream issuing from the emitter;

a lubrication target located in a spaced relationship from said emitter within the travel path; and switch means located proximate said emitter between said emitter and said target and in a non-contact relationship with said emitter, said switch means comprising first elements for intermittently generating a disturbance to said propellent gas stream whereby the carrying of the droplets by the propellent gas stream is prevented during the time interval of such disturbance and second elements for permitting the carrying of the droplets by the propellent gas stream past said switch and to said target.

9. The system of claim 8 wherein said switch means comprise a moving plate with at least one aperture therein, the aperture comprising said second elements.

10. The system of claim 9 wherein the plate is in the form of a shell around the target.

11. The system of claim 10 wherein the shell is in the form of a cylinder.

12. A method for the intermittent lubrication of a lubrication target, comprising the steps of:

locating a lubricant emitter having means for generating a series of lubrication liquid droplets and carrying the droplets along a travel path by a propellent gas stream issuing from the emitter in a spaced relationship from the target wherein the target is within the travel path;

locating moving barrier means proximate said emitter between said emitter and said target in a non-contact relationship with said emitter; and moving the barrier means to generate intermittent disturbances to said propellent gas stream whereby the carrying of the droplets by the propellent gas stream is prevented during the time interval of such disturbance, the carrying of the droplets by the propellent gas stream occurring during the time interval in which the disturbance ceases.

13. The method of claim 12 wherein the barrier means is a disc oriented in a plane perpendicular to the travel path, said moving step comprising the rotation of the disc about a central axis parallel to the travel path.

14. The method of claim 12 wherein the barrier means is a shell surrounding the lubrication target, said moving step comprising the rotation of the shell about the lubrication target.

\* \* \* \* \*